Patented Dec. 10, 1929

1,738,785

UNITED STATES PATENT OFFICE

RALPH H. McKEE AND STEPHEN P. BURKE, OF NEW YORK, N. Y., ASSIGNORS OF ONE-HALF TO RALPH L. BROWN, OF SYRACUSE, NEW YORK, AND ONE-HALF TO WILLIAM W. ODELL, OF PITTSBURGH, PENNSYLVANIA

PROCESS OF MAKING HIGHER ALCOHOLS

No Drawing. Application filed February 21, 1923. Serial No. 620,484.

The present invention relates to the preparation of the higher secondary alcohols, such as secondary butyl, amyl and hexyl alcohols from the corresponding unsaturated hydrocarbons, butylene, amylene, hexylene, etc.; and comprises a process whereby these higher alcohols may be prepared by a direct synthesis with steam in presence of a suitable catalyst.

It is well known that ethylene may be prepared in high yields by passing ethyl alcohol at about 400° C. over certain catalysts, of which aluminum oxid and kaolin are types. The products of this reaction are chiefly ethylene and steam; but the reaction is not, to any substantial degree, reversible. That is to say, ethylene and steam passed over these catalysts do not at any temperature, so far as known, give substantial yields of ethyl alcohol. We have now discovered that the higher secondary alcohols differ sharply from ethyl alcohol in this respect, and may be synthesized with good yields by passing the corresponding unsaturated hydrocarbons, admixed with sufficient steam, over these and other catalysts at appropriate temperatures.

Following is an illustrative procedure in accordance with this invention, it being understood that the invention is not restricted to the particular proportions, temperatures or catalytic agents mentioned therein by way of example:

A suitable source of the unsaturated hydrocarbons is the gas mixture obtained as a by-product from cracking petroleum oils under pressure. This gas mixture is compressed to about 300 lbs. per square inch, and the pressure slowly released, either to atmospheric pressure, or to some pressure above atmospheric, say 100 lbs. per square inch. Those constituents which remain liquid at the lower pressures are withdrawn, and are suitable for blending with gasoline. The gases are rich in the unsaturated hydrocarbons, mostly butylene, amylene, and hexylene. These are mixed with several volumes, advantageously about four volumes, of steam; and the mixture is passed at a high temperature, preferably about 300°–450° C. over aluminum oxid or equivalent catalyst. The secondary alcohol is produced with yields varying according to the operating conditions, but attaining under some conditions 80% or upward of the theory. The effluent may be cooled, the alcohols removed by cooling, and the residual gases again admixed with steam, if desired, and returned over the catalyst in a repetition of the cycle. The product in this particular case will consist mostly of butyl and amyl alcohols, with a lesser amount of hexyl alcohol, and usually a small amount of propyl alcohol. These may be separated by known methods.

Instead of aluminum oxid we may use other refractory oxids or oxid mixtures having the same essential properties, as, for example, aluminum phosphate, thorium dioxid, zirconium dioxid, oxids of titanium or vanadium, kaolin and other silicates and the like.

While the optimum operating conditions may vary somewhat according to the catalyst used, it may be stated that as a general rule, the lower the temperature, with a lower limit about 300° C., the higher the percentage of alcohol at the equilibrium point. On the other hand, the higher the temperature the more rapid the reaction; and temperatures between say 350° and 450° C, are now regarded as most advantageous. Our invention is not limited however to this particular temperature range.

Dilution of the reaction mixture with inert gases is undesirable, as tending to decrease the capacity of the apparatus without increasing the yield.

Pressures above atmospheric assist the reaction. We prefer at present to operate at pressures of the order of 100 lbs. per square inch, although our invention is not limited in this respect, as good yields are obtainable at atmospheric pressures.

We claim:

1. Process of making higher alcohols comprising contacting a gas mixture which comprises an unsaturated hydrocarbon corresponding to a higher alcohol to be made and steam with a solid catalyst capable of promoting the hydrolysis of the hydrocarbon to alcohol at a temperature with a lower limit about 300° C.

2. Process of making higher alcohols which comprises contacting a gas mixture containing unsaturated hydrocarbons produced by cracking petroleum oils in admixture with steam with a solid catalyst capable of promoting the hydrolysis of the unsaturated hydrocarbons to alcohols at a temperature with a lower limit about 300° C.

3. Process of making higher alcohols comprising contacting a mixture which comprises steam and a gaseous unsaturated hydrocarbon mixture containing principally butylene, amylene and hexylene with a solid catalyst capable of promoting the hydrolysis of the hydrocarbons to alcohols at a temperature with a lower limit of about 300° C.

4. Process of making higher alcohols comprising contacting a gas mixture which comprises an unsaturated hydrocarbon corresponding to a higher alcohol to be made and steam with a solid catalyst capable of promoting the hydrolysis of the hydrocarbon to alcohol at a temperature of from about 300° to about 450° C.

5. Process of making a higher alcohol which comprises contacting a gas mixture comprising steam and an unsaturated hydrocarbon corresponding to the higher alcohol to be made with a solid catalyst capable of promoting the hydrolysis of the hydrocarbon to alcohol at a temperature of from about 350° to about 450° C.

6. Process of making a higher alcohol which comprises contacting a gas mixture comprising steam and an unsaturated hydrocarbon corresponding to the higher alcohol to be made with a solid catalyst capable of promoting the hydrolysis of the hydrocarbon to alcohol at a temperature with a lower limit of about 300° C. and under a pressure greater than atmospheric pressure.

7. Process of making higher alcohols comprising contacting a gas mixture which comprises an unsaturated hydrocarbon corresponding to a higher alcohol to be made and steam with a solid catalyst capable of promoting the hydrolysis of the hydrocarbon to alcohol at a temperature with a lower limit of about 300° C. and under a pressure of the order of 100 pounds per square inch.

8. Process of making a higher alcohol comprising contacting a gas mixture which comprises more than one volume of steam to one volume of an unsaturated hydrocarbon corresponding to the higher alcohol to be made with a solid catalyst capable of promoting the hydrolysis of the hydrocarbon to alcohol at a temperature with a lower limit of about 300° C.

9. Process of making a higher alcohol comprising contacting a gas mixture which comprises about four volumes of steam for each volume of an unsatured hydrocarbon corresponding to the higher alcohol to be made with a solid catalyst capable of promoting the hydrolysis of the said hydrocarbon to alcohol at a temperature with a lower limit of about 300° C.

10. Process of making higher alcohols which comprises mixing gases produced by cracking petroleum oils containing unsaturated hydrocarbons including butylene, amylene and propylene and free of the bulk of lower boiling constituents with steam in about the proportion of one volume of gas to four volumes of steam, passing the mixture in contact with aluminum oxide at a temperature of from 350° to 450° C. at a super-atmospheric pressure of the order of 100 pounds per square inch.

11. Process of making higher alcohols as defined in claim 1 in which the unsaturated hydrocarbon is amylene and in which the gas mixture is contacted with the catalyst at a temperature of about 350–450° C.

12. Process of making higher alcohols as defined in claim 1 in which the unsaturated hydrocarbon is amylene and the quantity of steam in the gas mixture is in excess of that necessary to hydrolyze the amylene and the catalyst is aluminum oxide and the gas mixture is contacted with the catalyst at a temperature of about 350–450° C. and at a super-atmospheric pressure of the order of 100 pounds per square inch.

In testimony whereof we affix our signatures.

RALPH H. McKEE.
STEPHEN P. BURKE.